(12) United States Patent
Rukavina et al.

(10) Patent No.: US 7,275,666 B2
(45) Date of Patent: Oct. 2, 2007

(54) ADAPTER FOR BLENDER PITCHER

(75) Inventors: Stephen P. Rukavina, Bedford Heights, OH (US); Richard D. Boozer, Wakeman, OH (US); Robert M. Ulanski, Broadview Heights, OH (US); Jonathan M. Katz, Solon, OH (US)

(73) Assignee: Vita-Mix Corporation, Cleveland, OH (US)

( * ) Notice: Subject to any disclaimer, the term of this patent is extended or adjusted under 35 U.S.C. 154(b) by 502 days.

(21) Appl. No.: 10/851,800

(22) Filed: May 21, 2004

(65) Prior Publication Data

US 2005/0258197 A1    Nov. 24, 2005

(51) Int. Cl.
*B01F 7/00* (2006.01)

(52) U.S. Cl. .................. 222/570; 220/731; 99/645; 366/347; 222/569

(58) Field of Classification Search ............. 222/571, 222/465.1, 570, 566, 567, 108, 569; 220/731, 220/733; 99/645; 366/347
See application file for complete search history.

(56) References Cited

U.S. PATENT DOCUMENTS

| | | | |
|---|---|---|---|
| 2,837,256 A | * | 6/1958 | Daner ......................... 222/568 |
| 3,994,424 A | * | 11/1976 | Koeller ........................ 222/570 |
| 4,900,160 A | * | 2/1990 | Brooks et al. .............. 366/347 |
| 5,123,576 A | * | 6/1992 | Lawrence .................... 222/570 |
| 5,275,307 A | | 1/1994 | Freese .......................... 222/42 |
| 6,135,019 A | | 10/2000 | Chou ........................... 99/513 |
| 6,164,575 A | | 12/2000 | Karkos, Jr. ............. 241/199.12 |
| 6,435,708 B1 | * | 8/2002 | Huang ......................... 366/347 |

FOREIGN PATENT DOCUMENTS

JP    2002336139    11/2002

* cited by examiner

*Primary Examiner*—J. Casimer Jacyna
(74) *Attorney, Agent, or Firm*—Renner, Kenner, Greive, Bobak, Taylor & Weber (57) ABSTRACT

A container adapter (10) includes lower sidewalls (42, 43, 44, 45) and upper sidewalls (56, 57, 58, 59) separated by a rim (40). The lower side walls (42, 43, 44, 45) may be received within a pitcher (12), and the rim (40) is positioned on the upper open end (16) of the pitcher (12). The upper sidewalls (56, 57, 58, 59) increase the height of the pitcher (12) so that it can interface with a splash shield (33) of an ice chute (32) of a drink blending machine (20). Side clamps (50) assist in maintaining the adapter (10) on the pitcher (12), and a pouring spout (62) is provided at the junction of two of the upper sidewalls (58, 59).

12 Claims, 6 Drawing Sheets

ADAPTER FOR BLENDER PITCHER

TECHNICAL FIELD

The present invention relates to a blender pitcher and drink blending machine for blending a working medium made with portions of liquid and ice. More particularly, the present invention relates to an adapter which interfaces the blender pitcher with a drink blending machine to allow ice to be transferred into the blender pitcher. More specifically, the present invention relates to a adapter for raising the effective vertical height of the blender pitcher to interface with a drink blending machine which effectively prevents ice and a working medium from escaping the confines of the blender pitcher.

BACKGROUND ART

Drink blending machines have become very popular and have gained wide acceptance in the restaurant and bar industries. During a mixing process, these drink blending machines are used to create slush-like drinks commonly referred to as "frozen" drinks, which are very popular beverages among today's consumers.

Drink blending machines generally include an ice shaving unit used in conjunction with a blending assembly. The ice shaving unit serves as an ice dispenser for dispensing a portion of ice into a blender pitcher used as part of the blending assembly. A portion of liquid, which often includes an alcoholic beverage, is also provided in the blender pitcher. To facilitate the mixing of the liquid and ice to create above-discussed slush-like drinks, the blending assembly rotates a blending blade provided in the blender pitcher.

The blender pitcher has an open end adapted to receive a lid which prevents liquid and ice from escaping the blender pitcher during the mixing process. In the past, the lid typically included a slot adapted to receive an ice chute extending downwardly from the ice shaving unit. The ice chute provides a pathway from the ice shaving unit into the blender pitcher for the ice to travel. As such, the lid allows a portion of ice (via the ice chute) to travel into the blender pitcher through the slot, while, simultaneously, preventing liquid and ice from escaping the blender pitcher during the mixing process.

However, because the space underneath the ice chute on the drink blending machine has fixed dimensions, the blender pitcher must have had the necessary vertical height to allow the ice chute to extend into the open end of the blender pitcher through the slot provided in the lid. That is, the blender pitcher must have been tall enough to allow the ice chute to be properly located relative to the open end of the blender pitcher.

To save time during the mixing process by eliminating the need to remove and replace the lid on the open end of the blender pitcher, an ice shield attached to the ice chute has been substituted for the above-discussed lid. For example, when using the lid, it was necessary to remove the lid from the blender pitcher after the mixing process was complete to allow the slush-like drinks to be poured into a serving container. Afterwards, the lid would have had to be replaced on the pitcher to allow its further use on the drink blending machine.

To decrease the time intervals between uses of the drink blending machine, the need to remove and replace the lid was eliminated through use of a splash shield. The splash shield is pivotably attached to the ice chute, and is sized to cover the open end of the blender pitcher. When positioned proximate the open end of the blender pitcher, the splash shield prevents liquid and ice from escaping the blender pitcher during the mixing process.

When the blender pitcher is being positioned on the drink blending machine, the splash shield initially swings upwardly to accommodate the blender pitcher. Thereafter, when the blender pitcher is located on the drink blending machine, the splash shield swings downwardly to rest proximate the open end of the blender pitcher. Again, because the space underneath the ice chute on the drink blending machine has fixed dimensions, the blender pitcher must have had the necessary vertical height to allow the ice chute to be received in, and the splash shield to be positioned proximate to, the open end of the blender pitcher.

Therefore, whether using a blender pitcher with or without a lid, the blender pitcher was previously required to have a vertical height tall enough to position the ice chute within its open end. Blender pitchers having tall vertical heights may not have the ideal dimensions for all blending applications. For example, such blender pitchers generally have relatively small interior dimensions adjacent the blending blade. However, blender pitchers having larger interior dimensions allow for a larger blending blade, and greater amounts of liquid and ice to be provided around the cutting plane of the blending blade.

Depending on the working medium (i.e. the liquid and ice to be mixed in the blender pitcher), blender pitchers having larger interior dimensions provide better results during the mixing process. To avoid being unwieldy, however, blender pitchers having larger interior dimensions are by necessity shorter than the blender pitchers described above. Furthermore, these shorter blender pitchers having larger interior dimensions ideally have substantially square cross-sections, where their vertical walls are oriented adjacent one another at approximately ninety degrees. As such, these shorter square cross-sectioned blender pitchers are configured to allow a greater amount of working medium to be provided around the cutting plane of the blending blade, and, simultaneously, to direct the working medium impinging on their vertical walls back through the cutting plane. The use of these shorter square cross-sectioned blender pitchers may provide better results during the mixing process.

Therefore, there is the desire to use the shorter square cross-sectioned blender pitchers in conjunction with the above-described drink blending machine, and there is a need for a container adapter to facilitate such use. The container adapter should be capable of raising the effective vertical height of the shorter square cross-sectioned blender pitchers to allow for the ice chute to be received in, and the splash shield to be positioned proximate, the open end thereof, while, simultaneously, providing an integral pouring spout to easily pour the working medium from the blender pitcher after the mixing process is complete.

DISCLOSURE OF THE INVENTION

It is thus an object of the present invention is to provide a container adapter which effectively raises the vertical height of a shorter pitcher to allow for the ice chute to be received in and the splash shield to be positioned proximate the open end thereof.

It is another object of the present invention to provide a container adapter, as above, which provides an inclined interface surface with which the splash shield pivotably attached to the ice chute can interface to prevent working medium from escaping the pitcher during the mixing process.

It is an additional object of the present invention to provide a container adapter, as above, which provides an integral pouring spout to allow the working medium to be easily poured from a pitcher after the mixing process is complete.

These and other objects of the present invention, as well as the advantages thereof over existing prior art forms, which will become apparent from the description to follow, are accomplished by the improvements hereinafter described and claimed.

In general, an adapter for a pitcher having an open end includes lower sidewalls adapted to be received within the open end of the pitcher and upper sidewalls to increase the height of the pitcher. A rim is provided between the lower sidewalls and the upper sidewalls and is adapted to rest on the open end of the pitcher.

In accordance with another aspect of the present invention, a container adapter is adapted to be removably attached to a blender pitcher and includes lower sidewalls, adjacent of which are interconnected with one another, and upper sidewalls, adjacent of which also are interconnected with one another. A rim is provided on the container adapter which effectively separates the lower sidewalls from upper sidewalls. At least one side clamp extends downwardly from the rim adjacent one of the lower sidewalls, and a pouring spout is provided along the interconnection of two of the upper sidewalls.

A preferred exemplary container adapted incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 3:
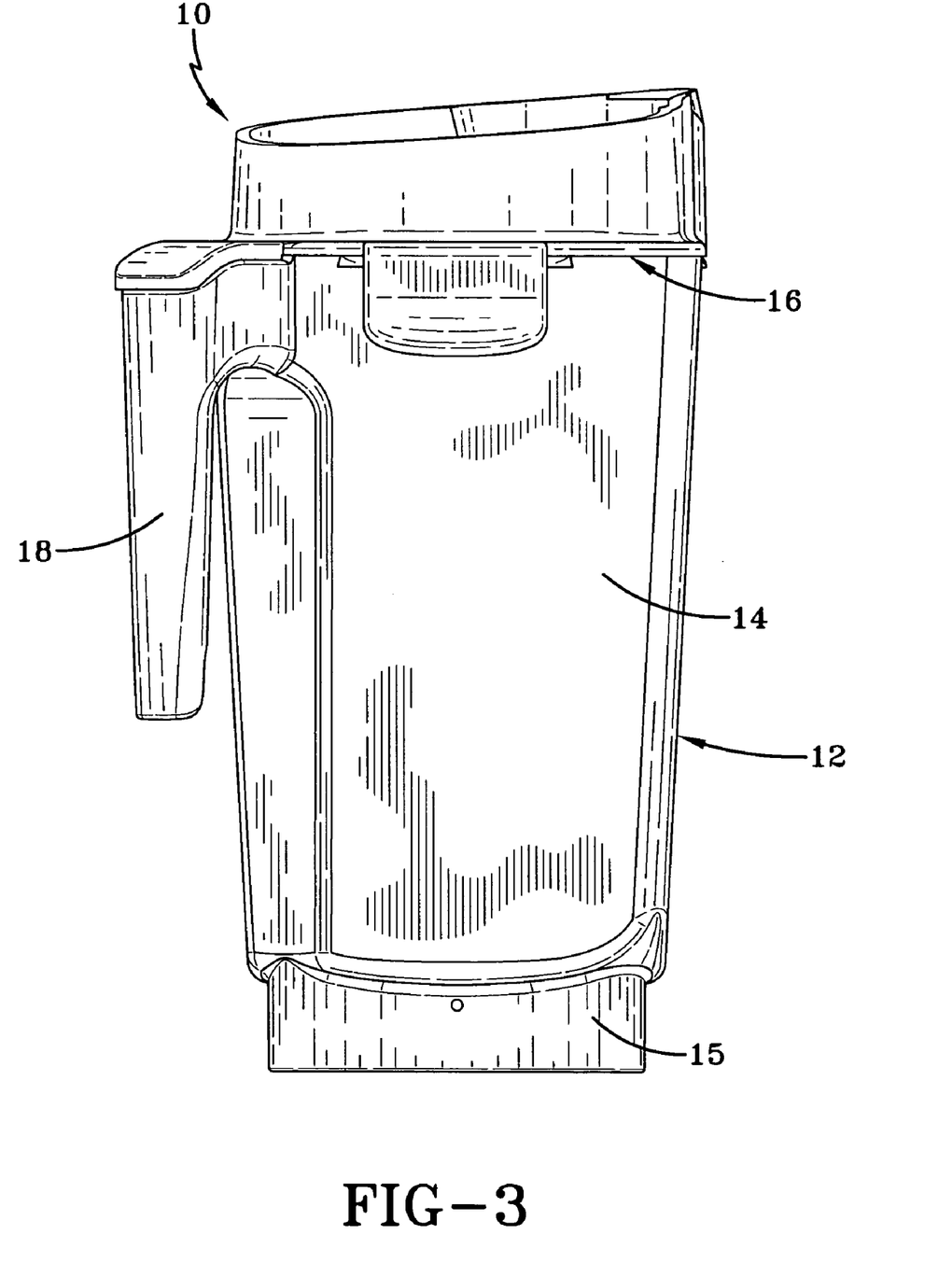
FIG. 3 is an elevational view of the container adapter according to the present invention positioned on a blender pitcher.

A container adapter according to the present invention is generally indicated by the numeral 10, and, as shown in FIG. 3, is configured to fit on top of a blender pitcher 12. Blender pitcher 12 has four sidewalls 14 (one of which is seen in FIG. 3), which are preferably oriented at ninety degrees to one another. As such, blender pitcher 12 has a substantially square cross-section which aids in the mixing process. Blender pitcher 12 also includes a base 15 from which sidewalls 14 extend upwardly therefrom. Sidewalls 14 define the interior of blender pitcher 12, and terminate to provide an open end 16 on which container adapter 10 is ultimately positioned. Base 15 carries a blending blade (not shown) which is configured to rotate within blender pitcher 12 to mix a working medium (i.e. the liquid and ice to be mixed in the blender pitcher). Blender pitcher 12 is provided with a handle 18 to allow for easy gripping of pitcher 12 by a user. Because pitcher 12 is designed to be stackable (thus allowing another, similar pitcher to be partially inserted within its interior), handle 18 is ideally hollow, which allows the handle of a "stacked" container to fit within its confines.

Figure 4:
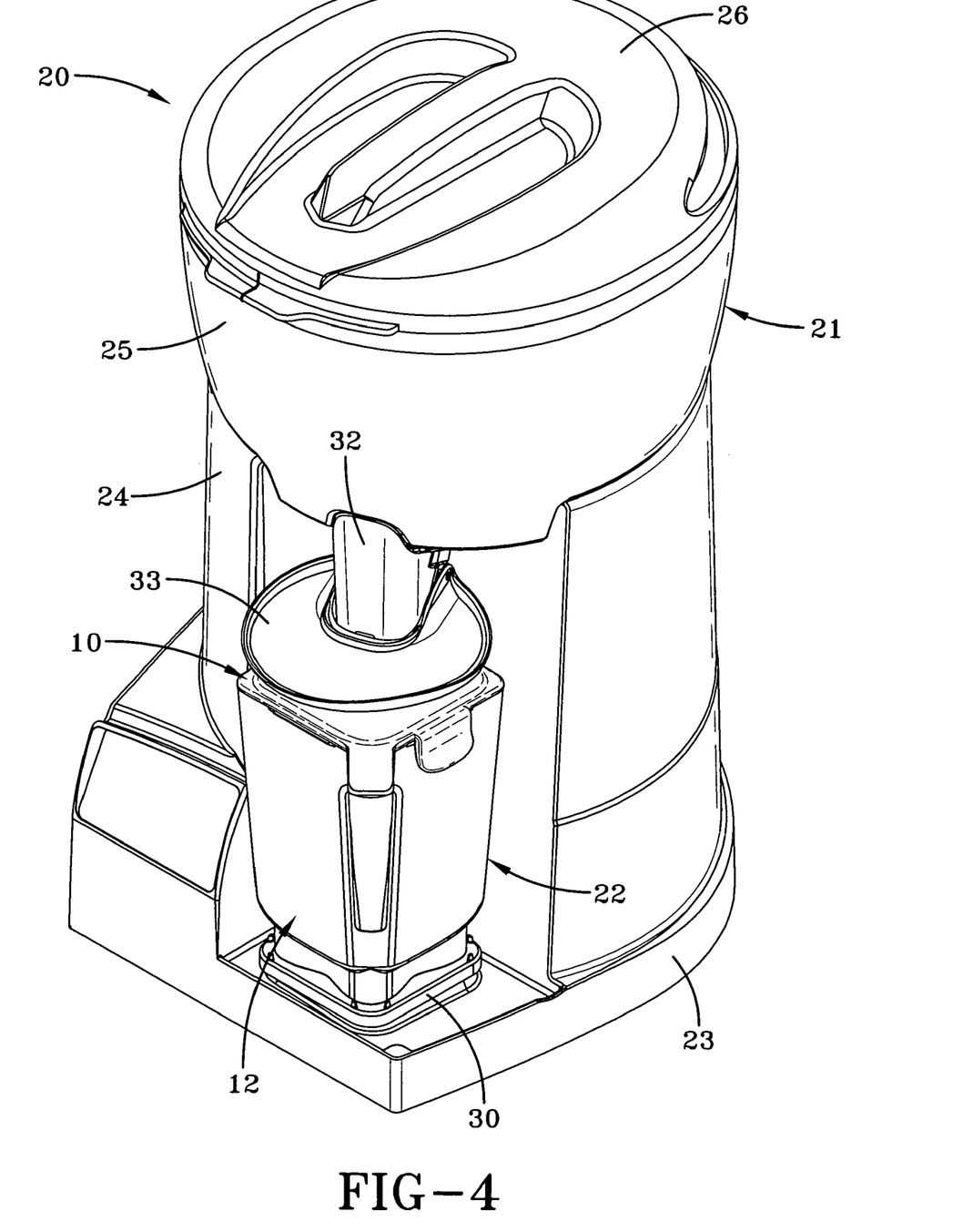
FIG. 4 is a perspective view of a drink blending machine with the blender pitcher including the container adapter according to the present invention positioned thereon.
Figure 5:
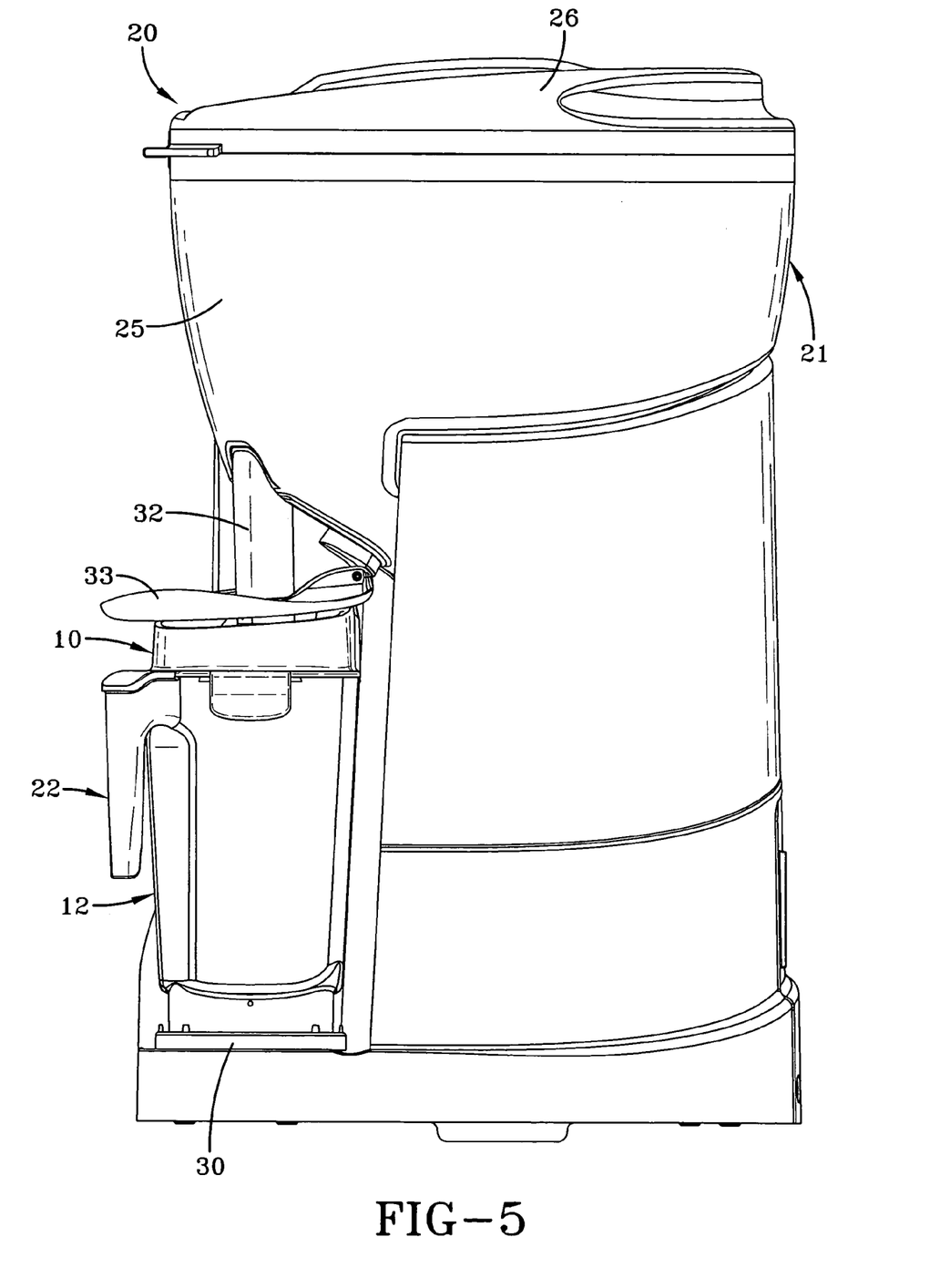
FIG. 5 is an elevational view of the drink blending machine with the blender pitcher including the container adapter according to the present invention positioned thereon.

Blender pitcher 12 can be utilized with a drink blending machine generally indicated by the numeral 20 in FIGS. 4 and 5. Drink blending machine 20 includes an ice dispenser (preferably in the form of an ice shaving unit), generally indicated by the numeral 21, and a blender assembly of which the blender pitcher 12 is a part, generally indicated by the numeral 22. Drink blending machine 20 also includes a base portion 23 which supports a partially cylindrical pedestal 24. The partially cylindrical pedestal 24 supports an ice bin 25, which is part of the ice dispenser 21, and is configured to carry a supply of ice. Ice dispenser 21 also includes a lid 26 for closing ice bin 25 which can readily removed from ice bin 25 to provide bin 25 with a supply of ice.

As seen in FIG. 5, blender assembly 22 includes a container pad 30 on which blender pitcher 12 is carried during the mixing process. Container pad 30 is used to properly locate blender pitcher 12, and includes a drive socket (not shown) which interfaces a motor (not shown) with blender pitcher 12 to rotate the blending blade.

Furthermore, as seen in FIGS. 4 and 5, ice dispenser 21 includes an ice chute 32. Ice chute 32 allows ice bin 25 to communicate with blender pitcher 12 so that ice can pass from ice dispenser 21 to the interior of blender pitcher 12. A splash shield 33 is pivotably attached to ice chute 32, and is provided to prevent the working medium from escaping blender pitcher 12 during the mixing process.

Container adapter 10 is provided so that a blender pitcher 12 with a relatively short vertical height can be used in conjunction with the drink blending machine 20 (as seen in FIG. 4). Container adapter 10 thus raises the effective vertical height of blender pitcher 12 to allow for the ice chute 32 to be received in and the splash shield 33 to be positioned proximate the interior thereof, and is preferably constructed of resilient rubber materials such as EPDM (ethylene propylene diene monomer) or nitrile.

Figure 1:
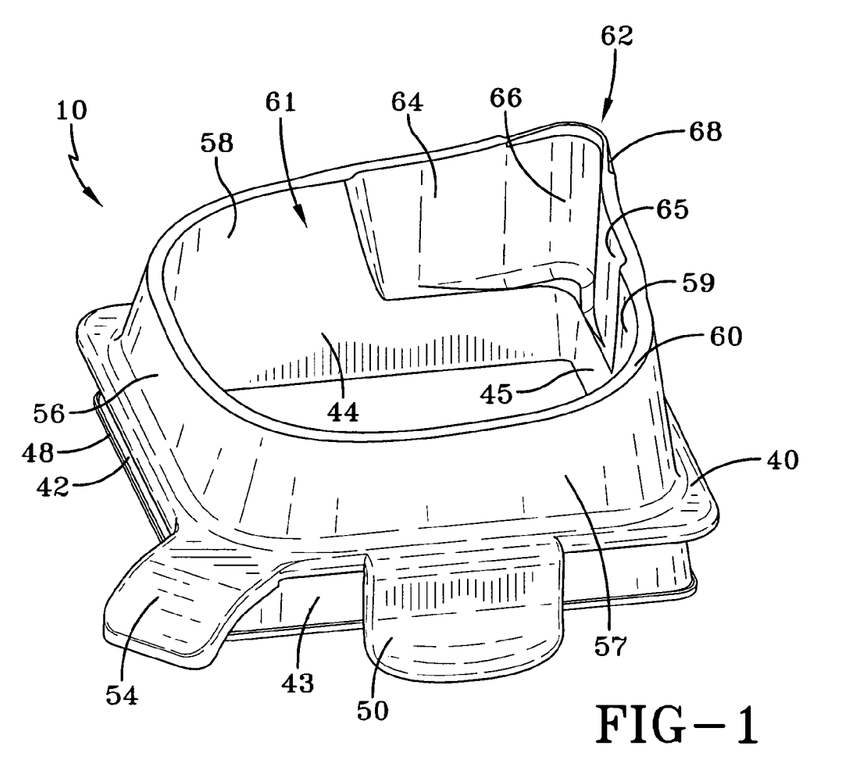
FIG. 1 is a perspective view of a container adapter according to the present invention.

As seen best seen in FIG. 1, container adapter 10 includes a rim 40 and four lower sidewalls 42, 43, 44, 45 extend downwardly from rim 40. Adjacent lower sidewalls 42, 43, 44, 45 are perpendicular to one another with smoothly contoured interconnections formed therebetween. As such, lower sidewalls 42, 43, 44, 45 are configured to form a substantially square shape in cross-section. Furthermore, each of lower sidewalls 42, 43, 44 45 has a slight incline thereto, and when interconnected, lower sidewalls 42, 43, 44, 45 expand slightly outward from top to bottom. As such, lower sidewalls 42, 43, 44, 45 form a frusto-pyramidal configuration which is sized slightly smaller than the upper interior dimensions of blender pitcher 12. Around the lower extremities thereof, lower sidewalls 42, 43, 44, 45 include an outwardly extending lip 48, which, as discussed below, aids with the interface of container adapter 10 with blender pitcher 12.

Container adapter 10 is configured to facilitate its removable attachment to blender pitcher 12. For example, when container adapter 10 is inserted within blender pitcher 12, the bottom surface of rim 40 rests on sidewalls 14 adjacent open end 16, and lower sidewalls 42, 43, 44, 45 are positioned within the interior of blender pitcher 12. Inside blender pitcher 12, lip 48 contacts the inner surfaces of sidewalls 14, and such contact forces lower sidewalls 42, 43, 44, 45 inward to reorient them in a substantially vertical position. Because container adapter 10 is made of a resilient material, lower sidewalls 42, 43, 44, 45 are biased to remain in their original orientation. As such, lower sidewalls 42, 43, 44, 45 have an outward bias which serves to press lower sidewalls 42, 43, 44, 45 against the inner surfaces of sidewalls 14 to effectively "clamp" container adapter to blender pitcher 12.

Figure 8:
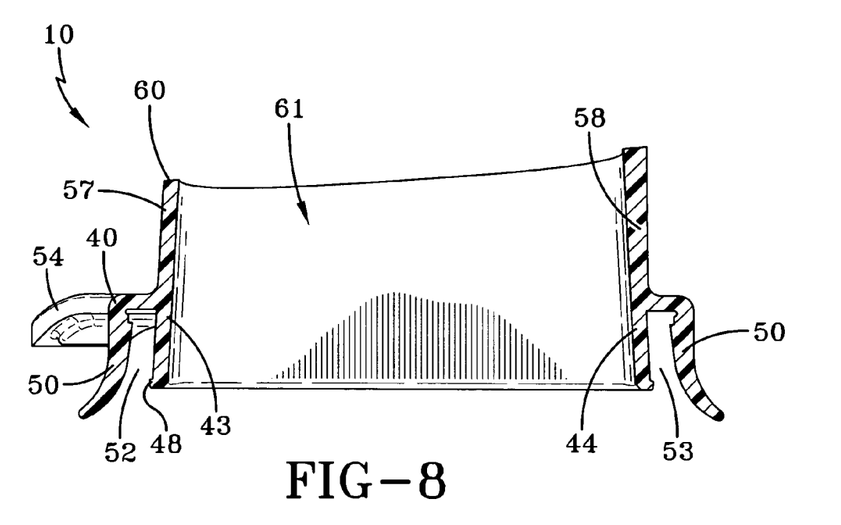
FIG. 8 is a sectional view taken substantially along line 8-8 of FIG. 6.

To further aid its removable attachment to blender pitcher 12, container adapter 10 is provided with side clamps 50. As seen in FIG. 8, side clamps 50 extend downwardly from rim 40 adjacent to sidewalls 43 and 44. Side clamps 50, together with rim 50 and sidewalls 43 and 44, form recesses 52 and 53 in which sidewalls 14 of blender pitcher 12 are received. In fact, the upper extremity of recesses 52 and 53 can be specially shaped to accommodate the shape of sidewalls 14 proximate open end 16. Therefore, when container adapter 10 is positioned on blender pitcher 12, two of the sidewalls 14 are received within recesses 52 and 53 to aid in its removable attachment to blender pitcher 12.

Extending outwardly from the rim 40 adjacent the interconnection between sidewalls 42 and 43 is a handle cover 54. As discussed above, handle 18 is hollow, and, therefore, handle cover 54 is adapted to cover the upper extremity of handle 18 to prevent working medium from entering therein. Moreover, when handle cover 54 is positioned to cover handle 18, container adapter 10 is properly positioned on blender pitcher 12.

Extending upwardly from rim 40 are upper sidewalls 56, 57, 58, 59. Adjacent upper sidewalls 56, 57, 58, 59, like adjacent lower sidewalls 42, 43, 44, 45, are perpendicular to one another, and there are smoothly contoured interconnections formed therebetween. Upper sidewalls 56, 57, 58, 59 are configured to have a substantially square shape in cross-section proximate the rim 40. Furthermore, on the exterior of container adapter 10, rim 40 effectively separates the outer surfaces of lower sidewalls 42, 44, 44, 45 from the outer surfaces of upper sidewalls 56, 57, 58, 59.

The upper extremities of sidewalls 56, 57, 58, 59 include an inclined surface 60 formed therearound. That is, as seen in FIG. 1, there is a gradual vertical transition along the upper extremities of upper sidewalls 56, 57, 58, 59 from the interconnection of sidewalls 56 and 57 (which form the low end of the inclined surface 60) to the interconnection of sidewalls 58 and 59 (which form the high end of the inclined surface 60). Therefore, the vertical height of sidewalls 58 and 59 is higher than the vertical height of sidewalls 56, 57.

Figure 2:
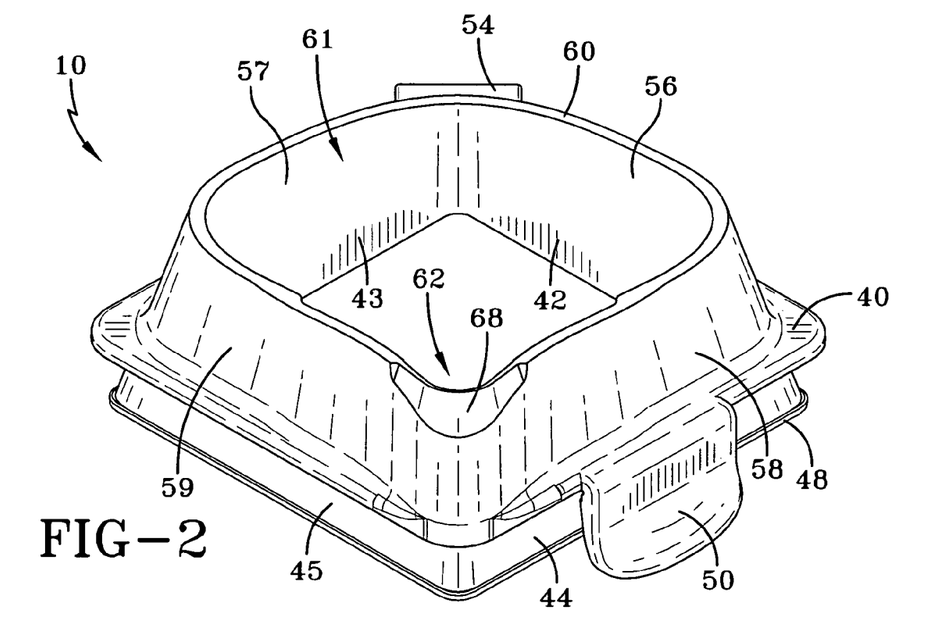
FIG. 2 is another perspective view of the container adapter according to the present invention.

Substantial portions of each of upper sidewalls 56, 57, 58, 59 have a slight incline thereto, and when interconnected have a frusto-pyramidal configuration. As seen in FIG. 8, the inner surfaces of upper sidewalls 56, 57, 58, 59 and lower sidewalls 42, 43, 44, 45 form the interior 61 of container adapter 10. Furthermore, the frusto-pyramidal configurations of upper sidewalls 56, 57, 58, 59 and lower sidewalls 42, 43, 44, 45 (except along the interconnection of sidewalls 58 and 59) allow for a smooth transition between their inner surfaces. To illustrate, as seen in FIG. 2, the inner surfaces of lower sidewall 42 and upper sidewall 56, and lower sidewall 43 and upper sidewall 57, share the same surface.

When container adapter 10 is positioned on blender pitcher 12, the vertical heights of upper sidewalls 56, 57, 58, 59 increase the effective vertical height of blender pitcher 12. Thus, when container adapter 10 is positioned on blender pitcher 12, and blender pitcher 12 is positioned on container pad 30, ice chute 32 is received within the confines of upper sidewalls 56, 57, 58, 59 in interior 61. As such, ice expelled from ice bin 25 through ice chute 32 can be received within blender pitcher 12 through interior 61. Therefore, because ice chute 32 is surrounded by upper sidewalls 56, 57, 58, 59, the ice can only be directed into blender pitcher 12.

Moreover, when container adapter 10 is properly positioned on blender pitcher 12, and blender pitcher 12 is positioned on container pad 30, inclined surface 60 is capable of interfacing with splash shield 33. The interface of inclined surface 60 with splash shield 33 prevents working medium from escaping blender pitcher 12 during the mixing process.

Figure 6:
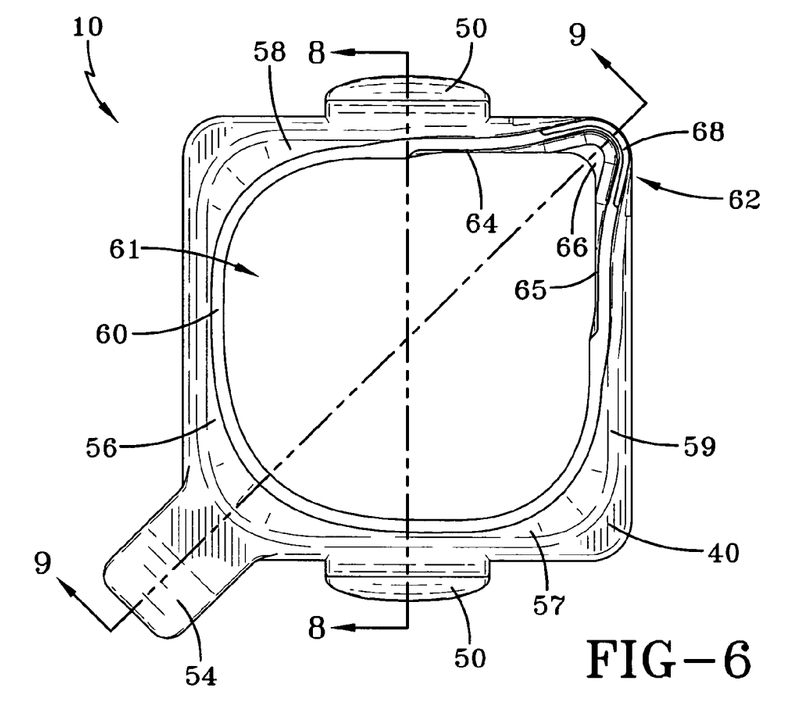
FIG. 6 is a top plan view of the container adapter according to the present invention.
Figure 7:
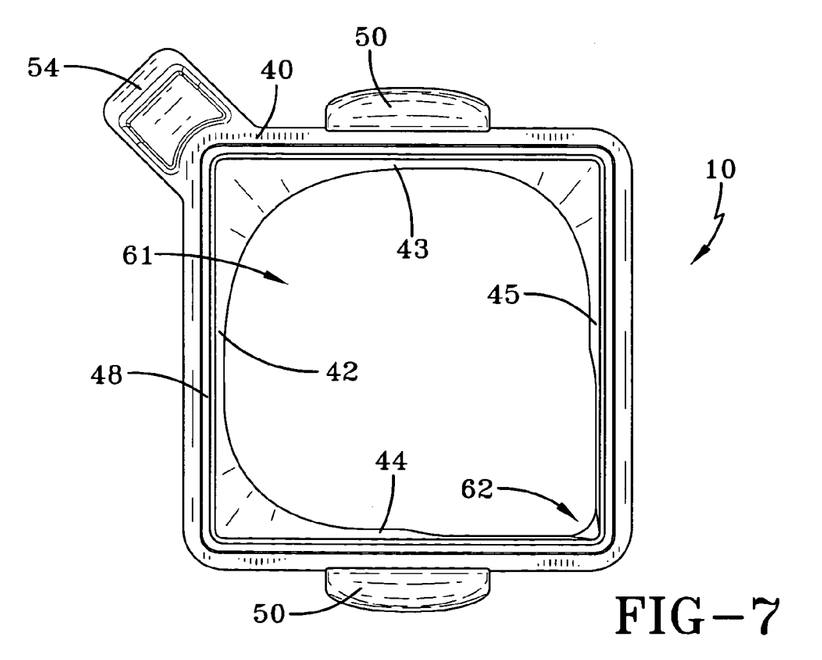
FIG. 7 is a bottom plan view of the container adapter according to the present invention.

Container adapter 10 also includes a pouring spout 62 formed from sidewalls 58 and 59. Unlike the remainder of sidewalls 58 and 59, which interconnect with sidewalls 56 and 57 to form the above-discussed frusto-pyramidal configuration, sidewalls 58 and 59 along their interconnection are substantially vertical. In fact, as seen in FIG. 6, sidewalls 58 and 59 expand outwardly near their interface, and, are partially aligned with rim 40 where the smoothly contoured interconnection is formed therebetween. That is, near their interconnection, sidewalls 58 and 59 expand so that their exterior surfaces are no longer offset from rim 40 along their interconnection.

Figure 9:
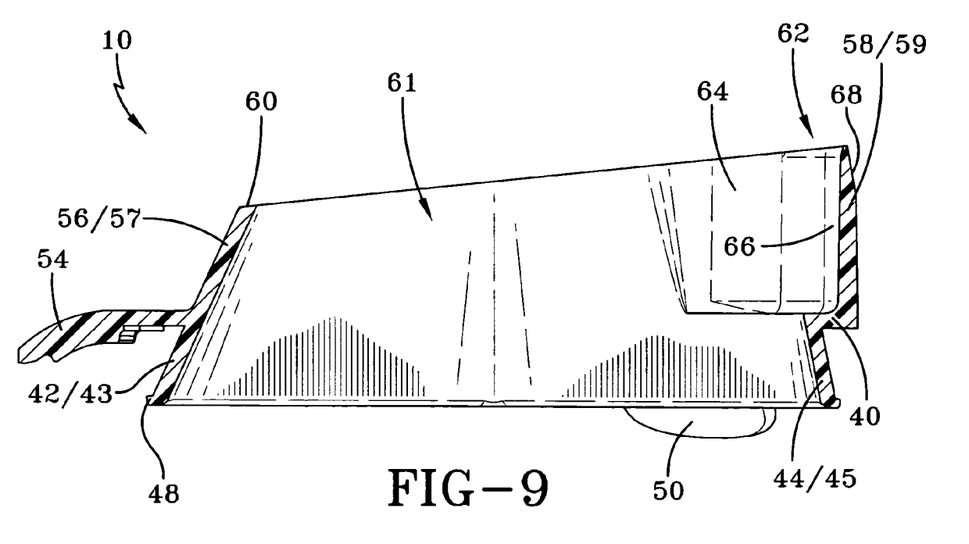
FIG. 9 is a sectional view taken substantially along line 9-9 of FIG. 6.

Proximate their interconnection, sidewalls 58 and 59 can be thickened so that indentations can be formed along the inner surfaces thereof. As such, the inner surfaces of sidewalls 58 and 59 (proximate their interconnection) are indented to form transition areas 64 and 65, respectively, and a pouring channel 66, as best seen in FIGS. 1 and 9. As such, the transition areas 64 and 65 lead into the pouring channel 66, and, therefore, are configured to direct the working medium thereto. These indentations in conjunction with the above-discussed shape of sidewalls 58 and 59 form the pouring spout 62. Further enhancing pouring spout 62 is a pouring lip 68 formed along upper extremity of pouring channel 66. Pouring lip 68 is formed from a slight tapering of the outer and inner surfaces of sidewalls 58 and 59 along their interconnection proximate the upper portion of pouring channel 66.

When container adapter 10 is properly positioned on blender pitcher 12, and blender pitcher 12 is tipped forward using handle 18, the working medium can be easily discharged from blender pitcher 12. As the working medium is flowing from blender pitcher 12, pouring spout 62 channels the working medium toward its intended destination. As such, the working medium, when container adapter 10 is used on blender pitcher 12, can be precisely poured into a serving container.

Thus, it should be evident that the container adapter 10 disclosed herein carries out one or more of the objects of the present invention set forth above and otherwise constitutes an advantageous contribution to the art.

What is claimed is:

1. A container adapter adapted to be removably attached to a blender pitcher, which can be used with a drink blending machine, the pitcher having sidewalls that terminate to form an open end, and a handle adapted to facilitate pouring of a working medium from the blender pitcher, the adapter comprising
  lower sidewalls, each said lower sidewall being connected to adjacent of said lower sidewalls;
  upper sidewalls, each said upper sidewall being connected to adjacent of said upper sidewalls;
  a lip at the bottom of said lower sidewalls and adapted to engage the inside of the pitcher sidewalls;
  a rim effectively separating said lower sidewalls from said upper sidewalls;
  at least one side clamp extending downwardly from said rim adjacent one of said lower sidewalls; and
  a pouring spout provided along the connection of two of said upper sidewalls.

2. A container adapter according to claim 1, where said upper sidewalls are adapted to raise the effective vertical height of the blender pitcher.

3. A container adapter according to claim 2, wherein the upper extremities of said upper sidewalls include an inclined surface formed therearound, said inclined surface being capable of interfacing with the drink blending machine.

4. A container adapter according to claim 1, wherein, when the container adapter is positioned on the blender pitcher, said rim is positioned on the upper extremities of the sidewalls of the blender pitcher, and said lower sidewalls of said container adapter are positioned within the interior of the blender pitcher.

5. A container adapter according to claim 1, wherein said pouring spout formed along said connection of said two of said upper sidewalls includes a pouring channel.

6. A container adapter according to claim 5, wherein said connection between said two of said upper sidewalls is smoothly contoured to form said pouring channel.

7. A container adapter according to claim 6, wherein the inner surfaces of said two of said upper sidewalls are indented to form transition areas leading to said pouring channel.

8. A container adapter adapted to be removably attached to a blender pitcher, which can be used with a drink blending machine, the pitcher having sidewalls that terminate to form an open end, and a handle adapted to facilitate pouring of a working medium from the blender pitcher, the adapter comprising
  lower sidewalls, each said lower sidewall being connected to adjacent of said lower sidewalls, said lower sidewalls expanding slightly outward from top to bottom, said lower sidewalls forming a frusto-pyramidal configuration sized slightly smaller than the open end of the blender pitcher;
  upper sidewalls, each said upper sidewall being connected to adjacent of said upper sidewalls;
  a rim effectively separating said lower sidewalls from said upper sidewalls;
  at least one side clamp extending downwardly from said rim adjacent one of said lower sidewalls; and
  a pouring spout provided along the connection of two of said upper sidewalls.

9. A container adapter according to claim 8, wherein, when the container adapter is positioned on the blender pitcher, said lower sidewalls are biased outwardly to press against the inner surfaces of the sidewalls of the blender pitcher.

10. A container adapter adapted to be removably attached to a blender pitcher, which can be used with a drink blending machine, the pitcher having sidewalls that terminate to form an open end, and a handle adapted to facilitate pouring of a working medium from the blender pitcher, the adapter comprising
  lower sidewalls, each said lower sidewall being connected to adjacent of said lower sidewalls, said lower sidewalls expanding slightly outwardly from top to bottom;
  upper sidewalls, each said upper sidewall being connected to adjacent of said upper sidewalls;
  a rim effectively separating said lower sidewalls from said upper sidewalls;
  at least one side clamp extending downwardly from said rim adjacent one of said lower sidewalls; and
  a pouring spout provided along the connection of two of said upper sidewalls;
  wherein at least one recess is formed between said at least one side clamp and said adjacent one of said lower sidewalls, said lower sidewalls pressing against the inner surface of the sidewalls of the blender pitcher, and at least one of said sidewalls of the blender pitcher positioned within said at least one recess, when the container adapter is positioned on the blender pitcher.

11. A container adapter adapted to be removably attached to a blender pitcher, which can be used with a drink blending machine, the pitcher having sidewalls that terminate to form an open end, and a handle adapted to facilitate pouring of a working medium from the blender pitcher, the adapter comprising
  lower sidewalls, each said lower sidewall being connected to adjacent of said lower sidewalls;
  upper sidewalls, each said upper sidewall being connected to adjacent of said upper sidewalls;
  a rim effectively separating said lower sidewalls from said upper sidewalls;
  at least one side clamp extending downwardly from said rim adjacent one of said lower sidewalls;
  a pouring spout provided along the connection of two of said upper sidewalls; and
  a handle cover adapted to cover the handle of the blender pitcher, the container adapter being properly positioned on the blender pitcher when said handle cover is positioned over the handle.

12. A container adapter according to claim 11, wherein said handle cover is formed opposite said pouring spout.

* * * * *